3,165,269
MANUFACTURE OF PHOSPHOR SUSPENSIONS
Alan Percival Blackburn, Shaw, and Edward Ernest Miles, Delph, England, assignors to The General Electric Company Limited, London, England
Filed Apr. 21, 1961, Ser. No. 104,761
Claims priority, application Great Britain, Apr. 29, 1960, 15,134/60
11 Claims. (Cl. 241—30)

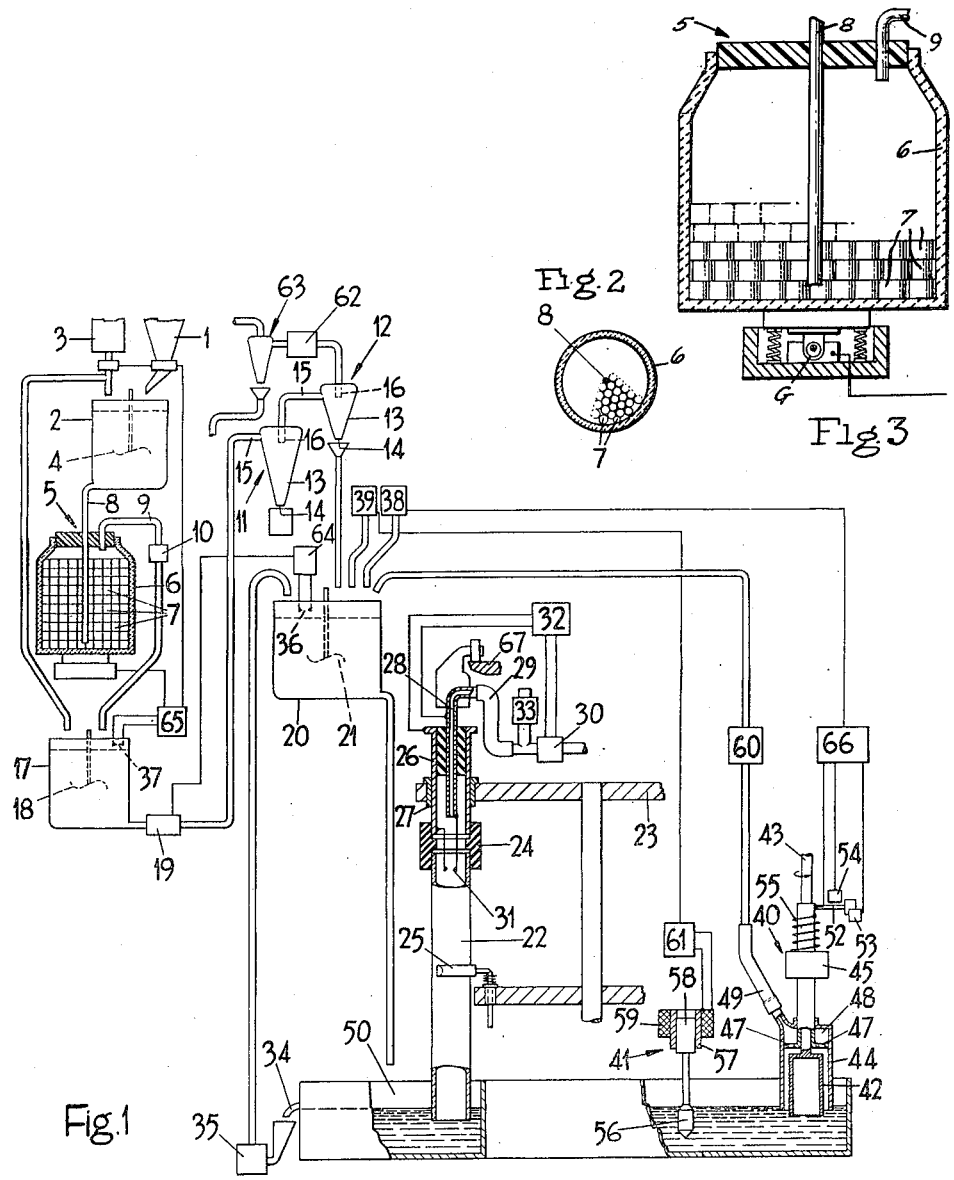

This invention relates to the manufacture of crystalline inorganic phosphor in powdered form, and more particularly to the manufacture of suspensions of such phosphor powder in a liquid carrier medium, especially, although not exclusively, for use in coating the tubular envelopes of the now well-known low pressure mercury vapour fluorescent electric discharge lamps in the manufacture of the lamps.

In the manufacture of a phosphor of the above kind the component materials from which the phosphor is formed are initially fired to cause them to combine and to develop the required crystalline form, and usually also to effect the incorporation of one or more activator materials into the crystal lattice.

The result of such firing is usually a sintered mass which has to be reduced to a finely divided form to render the phosphor suitable for use. For example for rendering a phosphor suitable for use in forming a coating on the envelope of a fluorescent lamp the phosphor has to be finally reduced to a fine powder in which substantially all the particles are of size less than 25 microns, and the majority are of size between 5 and 10 microns, in order that a smooth and even coating can be obtained.

Usually the sintered mass is initially crushed to form an intermediate powder having a high proportion of relatively coarse particles and this intermediate powder is milled to a fine powder form. However, the final reduction to the required particle size is left to the stage of dispersing the phosphor in the liquid carrier medium, for which an intensive milling is required to break up aggregates of the phosphor particles and ensure a very uniform dispersion of them.

Hitherto this final milling stage has usually been carried out in a rotary ball mill and several hours of such treatment have been found necessary for obtaining a sufficiently uniform suspension of the required particle size, for example for use in the manufacture of fluorescent electric discharge lamps.

An object of the present invention is to provide an alternative method of effecting the final milling and suspension forming stages which is particularly suitable for obtaining phosphor suspensions for use in coating the envelopes of fluorescent electric discharge lamps, and which has particular advantages over the present method using a rotary ball mill.

According to one aspect of the invention the manufacture of a suspension of a powdered inorganic crystalline phosphor in a liquid carrier medium includes the step of milling the phosphor powder together with the liquid carrier medium in a rapidly vibrated milling vessel containing a multiplicity of generally cylindrical and independently movable milling elements so as to effect a reduction of the particle size of the phosphor to a desired value whilst dispersing the particles in the liquid carrier medium.

It has been found that by an appropriate choice of the frequency and amplitude of the vibrations employed the milling of the powdered phosphor to a required particle size in a vibrating milling vessel in accordance with the invention can be effected much more rapidly than as at present carried out in a conventional rotary ball mill of comparable size.

It has also been found that the vibrations produce little or no overall motion of the suspension within the milling vessel, and this, coupled with the fact that milling is effected without rotating the milling vessel, has the advantage of enabling the method of the invention to be readily adapted to a continuous-flow method of producing the required phosphor suspension which it would be difficult or impossible to achieve with a rotating ball mill method of dispersing the phosphor particles in the liquid medium as at present carried out.

Thus according to the second aspect of the invention a method of manufacturing a suspension of powdered crystalline inorganic phosphor in a liquid carrier medium comprises feeding an initial suspension of the phosphor powder in the liquid carrier medium at a substantially constant rate through a vessel containing a multiplicity of generally cylindrical and independently-movable milling elements disposed in a plurality of layers along the direction of flow of the suspension within the vessel and each with its axis substantially parallel to said direction, whilst the vessel is rapidly vibrated, the rate of flow of the suspension through the vessel being so arranged that the outflow from the vessel constitutes a suspension of the desired uniformity and particle size.

The degree of particle size reduction produced for any form of apparatus used in carrying out this method of the invention, can be varied by adjusting the rate of flow of suspension through the milling vessel thereby enabling a required particle size to be readily obtained.

The milling vessel and elements must, of course, be formed of a material which does not have a deleterious effect on the phosphor being treated, and are preferably of ceramic material. Similarly the carrier liquid must not adversely affect the phosphor and preferably consists of water, the concentration of the phosphor powder in the water preferably being about 50%. Nitrocellulose in a suitable solvent may alternatively be used for manufacture which involves a nitrocellulose coating process, and additions for facilitating the coating process and improving the adhesion of the coating may of course be present in either case.

The phosphor suspension is preferably fed upwards through the milling vessel with the milling elements arranged within the milling vessel with their axes substantially vertical. The milling vessel itself is conveniently in the form of a right circular cylinder also supported with its axis substantially vertical, and in one continuous flow arrangement employing a milling vessel of cylindrical shape 300 millimetres long and 300 milimetres in diameter, substantially filled with cylindrical milling elements each 12 millimetres in length and 12 millimetres in diameter a satifactory milling of a phosphor powder containing an appreciable proportion of particles of sizes between 25 microns and 60 microns was obtained when the phosphor suspended in water was fed upwards through the vessel at a rate providing about 8 kilograms of phosphor per hour in the output suspension.

The continuous-flow method of suspension manufacture according to the second aspect of the invention has the further advantages for use in the coating of fluorescent lamp envelopes that the phosphor susepnsion can be fed automatically from the suspension forming apparatus to a separator for the removal of phosphor particles lying outside selected limits. In particular, with a water carrier for the phosphor the output suspension can conveniently be fed to a separator of the hydro-cyclone type arranged to remove ultra-fine phosphor particles having a particle size of less than 5 microns. An additional hydro-cyclone designed to remove particles of 25 microns or more which remain in the suspension after the final milling process is preferably also employed.

The suspension may in some cases be fed directly from the milling apparatus to the separator but in others it may be desirable to feed it first to an intermediate mixing vat where an additional quantity of carrier liquid is added to reduce the concentration of the suspension, and where other additions for promoting the use of the suspension may be added if required, the output from the vat being fed to the separator.

From the separator the suspension may, if desired, be fed automatically to the coating apparatus, which can be of any convenient construction, and in such a case it is preferably fed first to a coating suspension mixing vat, associated with means for regulating the viscosity and density of the suspension, before being fed to the coating apparatus.

The invention will be explained more fully by describing, by way of example with reference to FIGURES 1 to 3 of the accompanying drawings, the application of a continuous-flow method of producing a phosphor suspension, in accordance with the second aspect of the invention, to the manufacture of low pressure mercury vapour fluorescent electric discharge lamps.

In the drawings:

FIGURE 1 represents in diagrammatic form one kind of milling apparatus suitable for use in carrying out the method, together with an associated separator, a coating apparatus and auxiliary equipment, also shown diagrammatically, and FIGURE 2 represents a sectional plan view and FIGURE 3 a sectional elevation of the milling apparatus itself.

Referring to FIGURE 1 of the drawing, phosphor powder having a large proportion of particles of size between 25 and 60 microns is fed from a hopper 1 into an initial mixing vat 2 at a substantially constant rate where it is mixed with water fed to the vat, also at a constant rate, from a reservoir 3 to form a suspension having a concentration of about 50%.

A rotating stirrer 4 is provided in the mixing vat to ensure a substantially uniform dispersion of the phosphor powder in the water.

The phosphor suspension is fed from the initial mixing vat 2 under gravity to the bottom of a vibratory mill 5 in the form of a cylindrical porcelain vessel 6 having its axis approximately vertical and arranged to be vibrated both horizontally and vertically at a rate of about 40 c.p.s. by a vibration generator shown diagrammatically at G in FIG. 3. The milling vessel 6 has a height and diameter of about 300 millimetres and contains a multiplicity of hard ceramic milling elements 7 in the form of cylinders approximately 12.5 millimetres diameter and 12.5 millimetres long as shown more clearly in FIGURE 2, the elements being disposed with their axes vertical in a number of discrete horizontal layers and almost filling the vessel.

The feed-pipe 8 from the mixing vat 2 extends coaxially downwards into the milling vessel through the top of the vessel which is closed, the suspension passing upwards through the vessel in use of the mill and out through a further pipe 9 also extending trough the closed top of the vessel.

The vibrations produce little or no additional vertical motion of the suspension as it passes upwards through the milling vessel 6 so that a substantially uniform milling of the phosphor suspension is effected during its passage between the inlet and outlet pipes 8 and 9. An adjustable valve 10 in the outlet pipe 9 controls the rate of flow of the suspension through the mill 5, and is adjusted so that the phosphor powder is milled at the rate of about 8 kilograms per hour. The major proportion of the phosphor powder fed from the mill 5 has a particle size of between 5 and 10 microns with a small proportion of particles having a size of less than 5 microns or between 10 and 25 microns and a negligible proportion of particles having a size exceeding 25 microns.

Although the output of phosphor from the mill 5 is suitable in such a form for coating the envelopes of fluorescent electric discharge lamps it has been found that increased lamp efficiencies are obtained by the removal of particles which are less than 5 microns in size from the suspension prior to the coating process.

The suspension is therefore fed from the mill to a two stage cyclone separator which effects the desired separation of the ultra-fine particles from the suspension and also the small proportion of particles of size greater than 25 microns remaining in the suspension after milling.

The separator conveniently consists of two series-connected cyclones 11, 12, each comprising a cylindro-conical vessel 13 disposed vertically with the wider end uppermost, a small conical nozzle 14 at the downwardly-directed apex, an inlet tube 15 in the side, disposed tangentially at the widest part of the vessel, and an outlet tube 16, generally referred to as the vortex finder, projecting downwards for a short distance through the closed upper end of the vessel 13. In operation of such a cyclone the suspension of phosphor is fed under pressure through the inlet tube 15 into the interior of the cyclone; a spiralling motion of the suspension is set up and a double vortex is formed, the suspension first travelling downwards to the apex of the cone, the coarser particles of powder being thrown to the walls of the vessel and travelling downwards to be discharged in suspension through the apex nozzle 14, and liquid carrying finer particles then travelling upwards with air drawn in through the apex, in an inner vortex in the region of the axis of the vessel, to be discharged through the vortex finder 16 at the top of the vessel; the dimensions of the cyclone and the pressure of the suspension fed into it determine the degree of separation obtained.

In the arrangement illustrated the phosphor suspension is first fed under gravity from the vibrating mill 5 to an intermediate mixing vat 17 where water is added to reduce the concentration of the suspension to about 1.25%, this mixing vat also incorporating a stirrer 18 to maintain a substantially uniform dispersion of the powdered phosphor in the water. The suspension is then fed, by means of a pump 19, from the bottom of this mixing vat to the first cyclone 11. This cyclone has a total length of 250 millimetres and maximum and minimum internal diameters at the top and bottom respectively, of 60 and 2 millimetres, with an inlet tube diameter of 8 millimetres and a vortex finder diameter of 10 millimetres. The pressure of the suspension fed into the cyclone 11 by the pump is 50 pounds per square inch, and particles having a size exceeding 25 microns are collected in the apex 14 of the cyclone whilst particles of smaller size pass from the vortex finder 16 to the inlet tube of the second cyclone 12.

This second cyclone 12 has a length of 150 millimetres and internal diameters at the top and bottom respectively of 30 and 1 millimetres, the diameters of the inlet tube 15 and vortex finder 16 being 6 and 3 millimetres respectively. The pressure of suspension fed into this cyclone is 36 pounds per square inch and particles having a size exceeding 5 microns are discharged from the apex 14 of the cyclone whilst particles of smaller size are expelled from the vortex finder 16.

The phosphor suspension containing particles mainly in the range 5 to 10 microns is fed under gravity from the apex 14 of the second cyclone 12 to a coating suspension mixing vat 20, also incorporating a stirrer 21, and where controlled quantities of water and a suitable water-soluble binder, for increasing the viscosity of the suspension, are added. The binder should not have a deleterious effect on the phosphor and should be such that it can be decomposed by heat leaving little or no residual ash. One binder which has been found to be suitable is an aqueous solution of ammonium polymethacrylate, sold under the trade name "Vulcastab."

The coating suspension can then be fed direct from the mixing vat 20 to any suitable form of coating apparatus.

One suitable coating apparatus is that forming the subject of United States Patent No. 3,111,429. Such a coating apparatus is illustrated diagrammatically in the drawing, and includes an annular trough 50 into which the output of the coating suspension mixing vat 20 is arranged to be fed under gravity. The glass tubes 22 to be coated are mounted in turn at a loading position into holders of a rotatable turret 23, which is arranged to support the tubes above the trough with their axes vertical and to index them around a circular path from the loading position to an unloading position where they are subsequently removed from their respective holders.

Each holder incorporates a rubber sleeve connector 24 into which the top of a tube is arranged to be pushed at the loading position, the connector being a tight fit on the tube so that it supports the tube and also provides a vacuum-tight seal. Spring clips 25 located beneath the respective connectors 24 help to support the tubes 22 in the vertical position. Each connector 24 also fits over the lower end of a tubular metal support 26 slidably mounted in a co-operating guide 27 carried by the turret 23, and within this support is coaxially fitted a metal tube 28, the annular gap between the tube and the support being closed by insulating material. The top of the tube 28 is connected by means of a flexible pipe 29 to a suction-applying means (not shown) through an electromagnetically-operated valve 30.

Between the loading and unloading positions the lower end of each envelope tube 22 (only one of which is shown) is automatically introduced in turn into the suspension in the trough by the lowering of the respective support 26 under the action of a cam rail 67 and the tube is connected to the suction-applying means by the opening of the valve 30 which causes the suspension to be drawn up into the tube. When the suspension reaches a predetermined position near the top of the tube it makes contact with a pair of conducting probes 31 extending downwards through the connector 24 from the support 26 and metal tube 28 respectively and which form part of a control circuit 32, the suspension then establishing a connection between the probes 31 and resulting in the operation of the control circuit. This effects the closure of the valve 30, and a small adjustable valve 33, located in a side branch between the valve 27 and the top of the metal tube 28, and which side branch is open to the atmosphere, allows air at a controlled rate to be admitted into the tube 22 which permits the level of the suspension to fall gradually leaving a coating of the suspension on the inner surface of the tube.

After removal from the coating apparatus the coated tubes 22 are permitted to drain whilst heated air is blown through them to dry the coating, the tubes finally being baked to drive off any residual moisture and to remove the binder in accordance with known lamp manufacturing techniques.

The level of the suspension in the trough of the coating apparatus is maintained constant by means of an overflow pipe 34, excess suspension being led away to a pump 35 which is arranged to pump it back into the coating suspension mixing vat 20.

Control of the level of the suspension in the coating suspension mixing vat 20 is automatically regulated by a control device 64 which shuts off the pump 19 when the suspension reaches a predetermined height in the vat. This causes the level of the suspension in the intermediate mixing vat 17 to rise, and a further control device 65 is arranged to shut off supply of phosphor powder and water to the initial mixing vat 2 which feeds the mill 6 when the suspension on the intermediate mixing vat reaches a predetermined level. The control device 65 simultaneously stops the operation of the mill 6 so that no milling of the stationary phosphor takes place.

Both control devices 64, 65 can conveniently comprise electrical circuit arrangements each having a pair of spaced conducting probes 36, 37 respectively projecting downwards into the respective vats, and which are arranged to effect the operation of the appropriate controls when the suspension bridges the respective pair of probes.

The stirrers in the different mixing vats continue to operate even though the flow of suspension from the vats is interrupted, for maintaining a uniform dispersion of the phosphor powder in the water.

The supplies of binder and water are fed to the coating suspension mixing vat 20 through electrically controlled on-off valves 38, 39 respectively, the operation of which valves is automatically controlled in use of the apparatus by a viscometer 40 and densitometer 41 which can conveniently be located within the coating trough 50 as shown.

The viscometer conveniently comprises, as illustrated an inner drum 42 mounted coaxially on the lower end of a rotatable shaft 43, and surrounded by a close-fitting outer drum 44 carried by a fixed support 45 but being rotatable with respect to the support about the common axis of the drums. Both drums are open at the bottom and are supported with their open lower ends submerged beneath the level of the suspension in the trough.

The upper end of the outer drum 44 is perforated by a number of slots 47 communicating above the drum with a chamber 48 which is connected by means of a flexible pipe 49 to a pump 60, the pump being arranged to draw the suspension upwards through the narrow cylindrical gap between the drums, and subsequenty feed it back into the coating suspension mixing vat 20.

A spring 55 biasses the outer drum 44 to a rest position and when the inner drum 42 is rotated at a constant speed in use of the viscometer the outer drum is rotated from the rest position against the spring bias by an amount depending upon the viscosity of the suspension between the drums.

The outer drum carries a movable contact arm 52, which can engage, in different positions of rotation of the drum, with two fixed contacts 53, 54. The contacts form part of an electric regulator circuit 66 which effects the operation of the on-off valve 38 controlling the flow of the binder into the mixing vat. Thus when the movable contact engages the further one 54 of the two fixed contacts, indicative of a high viscosity, the regulator circuit is arranged to close the valve; as the viscosity decreases due to the continued addition of water and suspension to the vat 20 whilst no binder is added the movable contact 52 begins to move backwards towards the other fixed contact 53 and when it engages this contact the regulator circuit 66 re-opens the valve 38 and permits the binder to recommence flowing into the vat. The positions of the fixed contacts 53, 54 are critically adjusted so that the viscosity of the suspension within the mixing vat 20 and hence the trough 50 is maintained between two predetermined limiting values.

In an alternative arrangement the viscometer incorporates only one fixed contact corresponding to contact 53 of the apparatus described. In this arrangement the engagement of the fixed contact by the movable contact 52, indicative of a low viscosity, gives rise to the opening of the valve 38 as described to permit binder to commence flowing into the mixing vat 20. The viscosity of the suspension will gradually increase until the viscosity of the suspension between the drums 42, 44 is such that the movable contact 52 leaves the fixed contact, the valve 38 then being closed. The delay between the opening of the valve and the rise in the viscosity of the suspension between the drums, together with an appropriate control of the rate of binder fed into the mixing vat when the valve is open ensures that the viscosity of the suspension fed to the trough 50 is maintained between the required limiting values.

The densitometer 41 comprises a hydrometer float 56 carrying, at its upper end, an iron core 58 which is movable within a guide tube 57. A coil 59 forming part of a further regulator circuit 61, surrounds the tube 57 in the vicinity of the core 58 so that the effective inductance of the coil is varied by movement of the core as the position of the hydrometer float varies within the suspension. The output of the regulator circuit 61 depends upon the effective inductance of the coil 59 and controls the operation of the second on-off valve 39 controlling the flow of water into the vat 20, the arrangement being such that when the density of the suspension falls to a particular value the regulator circuit effects the closure of the valve 39 shutting off the flow of water into the vat. This results in a gradual increase in the density of the suspension within the vat 20 and subsequently the trough 50 until eventually the rise in the position of the iron core 58 within the coil 59 results in the re-opening the valve 39 and the water is once more permitted to flow into the vat. The position of the coil 59 is arranged so that the opening and closure of the valve 39 is effected at appropriate density values to maintain the density of the suspension within the trough between its upper and lower allowable limits.

Instead of an iron core 58 movable within a coil 59 the float 56 can alternatively carry an opaque shutter movable between a light projector and a photo-responsive device forming part of the regulator circuit 61, the shutter controlling the amount of light falling on the photo-responsive device in dependence on the height of the float in the suspension, and this controlling in turn the operation of the valve 39, through the regulator circuit 61, for maintaining the density of the suspension in the trough between the required limits.

Both the viscometer and densitometer can be mounted within the mixing vat 20 if desired.

The output from the vortex finder 16 of the second cyclone 12 is conveniently fed, by means of another pump 62 as shown, to a further cyclone 63 which separates from the ultra fine particles of phosphor any particles of greater size carried with them from the second cyclone.

These larger particles are discharged from the apex of the third cyclone 63 and are fed under gravity to the intermediate mixing vat 17 from which they are fed back through the cyclones 11 and 12.

We claim:

1. A milling apparatus for forming a suspension of powdered crystalline inorganic phosphor in a liquid carrier medium for use in coating glass tubes, designed to form the envelopes of fluorescent electric discharge lamps, internally with a layer of phosphor, said apparatus incorporating means for feeding controlled quantities of the phosphor and liquid carrier medium into a reservoir to form an initial suspension, a milling vessel containing a multiplicity of generally cylindrical and independently-movable milling elements disposed in a plurality of horizontal layers with the axes of the elements substantially vertical, means for feeding the initial suspension upwards through the milling vessel at a substantially constant rate, and means for vibrating the vessel both parallel and perpendicular to the axes of said milling elements to cause the particles to be milled on the passage of the suspension through the vessel.

2. A milling apparatus for forming a suspension of powdered crystalliine inorganic phosphor in a liquid carrier medium for use in coating glass tubes, designed to form the envelopes of fluorescent electric discharge lamps, internally with a layer of phosphor, said apparatus incorporating means for feeding controlled quantities of the phosphor and liquid carrier medium into a reservoir to form an initial suspension, a cylindrical milling vessel disposed with its axis substantially vertical and containing a multiplicity of generally cylindrical and independently-movable milling elements disposed in a plurality of horizontal layers extending across substantially the whole of the internal cross-section of the vessel with the axes of the elements substantially vertical, means for vibrating the vessel, and means for feeding the initial suspension upwards through the milling vessel at a substantially constant rate, and means for vibrating the vessel both parallel and perpendicular to the axes of said milling elements to cause the particles to be milled on the passage of the suspension through the vessel.

3. A milling apparatus for forming a suspension of powdered material in a liquid carrier medium comprising a milling vessel containing a multiplicity of generally cylindrical and independently-movable milling elements disposed in a plurality of horizontal layers with the axes of the elements substantially vertical, an inlet for an initial suspension of the powdered material in said carrier liquid at the bottom part of the vessel, an outlet for the milled suspension at the top part of the vessel, and means for vibrating the milling vessel during the passage of suspension through the vessel.

4. A method of manufacturing a suspension of a powdered inorganic crystalline phosphor in a liquid carrier medium: said method including the steps of arranging a multiplicity of generally cylindrical and independently-movable milling elements in a plurality of superposed layers, with the axes of the elements in each layer perpendicular to the layer interfaces, passing through each of said layers in turn an initial suspension of the phosphor powder in the liquid carrier medium, simultaneously producing a vibration of the elements both parallel and perpendicular to their axes to cause the particles to be milled on the passage of the suspension through the layers, so as to effect a reduction of the particle size of the phosphor to a desired value while dispersing the phosphor particles in the liquid carrier medium, and controlling the rate of flow of suspension through the layers so that the outflow constitutes a suspension of the desired uniformity and particle size.

5. A method according to claim 4 wherein water is used as the liquid carrier medium.

6. A method according to claim 4 wherein the milling elements are arranged in a plurality of substantially horizontal layers one on top of the other with the axes of the elements in each layer substantially vertical, and wherein the initial suspension is fed upwards through each of said layers in turn.

7. A method of manufacturing a suspension of a powdered inorganic crystalline phosphor in a liquid carrier medium, said method including the steps of: arranging in a vessel a plurality of superposed layers of generally cylindrical and independantly-movable milling elements with the axes of the elements parallel to each other and penpendicular to the layer interfaces and each layer extending across substantially the whole of the internal cross-section of the vessel, passing through each of said layers in turn, at a substantially constant rate, an initial suspension of the phosphor powder in the liquid carrier medium, simultaneously vibrating the vessel both parallel and perpendicular to the axes of said milling elements to cause the particles to be milled on the passage of the suspension through the layers so as to effect a reduction of the particle size of the phosphor to a desired value while dispersing the particles in the liquid carirer medium, and controlling the rate of flow of the suspension through the layers so that the outflow from the vessel constitutes a suspension of the desired uniformity and particle size.

8. A method of manufacturing a suspension of a powdered inorganic crystalline phosphor in a liquid carrier medium, said method including the steps of: arranging a multiplicity of generally cylindrical and independently-movable milling elements in a plurality of horizontal layers disposed one on top of the other in a milling vessel, with the layers each extending across substantially the whole of the internal cross-section of the vessel, and the axes of the elements in each layer substantially vertical, passing upwards through each of said layers in turn, at a substantially constant rate, an initial suspension of the phosphor powder in the liquid medium, simultaneously vibrating the vessel both parallel and perpendicular to the axes of said milling elements to cause the particles to be milled on the passage of the suspension through the layers so as to effect a reduction of the particle size of the phosphor to a desired value while dispersing the particles in the liquid carrier medium, and controlling the rate of flow of the suspension through the layers so that the outflow from the vessel constitutes a suspension of the desired uniformity and particle size.

9. A method of manufacturing a suspension of a powdered inorganic crystalline phosphor in a liquid carrier medium, said method including the steps of: arranging a multiplicity of generally cylindrical and independently-movable milling elements of ceramic material in a plurality of horizontal layers disposed one on top of the other in a milling vessel, with the layers each extending across substantially the whole of the internal cross-section of the vessel, and the axes of the elements in each layer substantially vertical, passing upwards through each of said layers in turn, at a substantially constant rate, an initial suspension of the phosphor powder in the liquid carrier medium, simultaneously vibrating the vessel both parallel and perpendicular to the axes of said milling elements to cause the particles to be milled on the passage of the suspension through the layers so as to effect a reduction of the particle size of the phosphor to a desired value while dispersing the particles in the liquid carrier medium, and controlling the rate of flow of the suspension through the layers so that the outflow from the vessel constitutes a suspension of the desired uniformity and particle size.

10. A milling apparatus for forming a suspension of powdered crystalline inorganic phosphor in a liquid carrier medium for use in coating glass tubes, designed to form the envelopes of fluorescent electric discharge lamps, internally with a layer of phosphor, said apparatus incorporating means for feeding controlled quantities of the phosphor and liquid carrier medium into a reservoir to form an initial suspension, a cylindrical milling vessel disposed with its axis substantially vertical and containing a multiplicity of generally cylindrical and independently-movable milling elements of ceramic material disposed in a plurality of horizontal layers extending across substantially the whole of the internal cross-section of the vessel with the axes of the elements substantially vertical, means for feeding the initial suspension upwards through the milling vessel at a substantially constant rate, and means for vibrating the vessel both parallel and perpendicular to the axes of said milling elements to cause the phosphor in the suspension to be milled.

11. A milling apparatus for forming a suspension of powdered material in a liquid carrier medium comprising a milling vessel containing a multiplicity of generally cylindrical and independently-movable milling elements of ceramic material disposed in a plurality of horizontal layers with the axes of the elements substantially vertical, an inlet for an initial suspension of the powdered material in said carrier liquid at the bottom part of the vessel, an outlet for the milled suspension at the top part of the vessel, and means for vibrating the milling vessel during the passage of suspension through the vessel.

References Cited by the Examiner

UNITED STATES PATENTS

| | | | |
|---|---|---|---|
| 2,323,544 | 7/43 | Kiesskalt et al. | 241—175 X |
| 2,360,893 | 10/44 | Robinson | 241—21 |
| 2,412,954 | 12/46 | Zdancewicz | 117—33.5 |
| 2,421,975 | 6/47 | Williams | 117—97 |
| 2,586,338 | 2/52 | Hushley | 241—21 |
| 2,778,577 | 1/57 | Linke | 241—175 X |
| 2,870,908 | 1/59 | Fitch | 209—211 |
| 2,905,572 | 9/59 | Jones | 117—33.5 |
| 2,922,588 | 1/60 | Hoesch | 241—46 |
| 2,987,414 | 6/61 | Martyny | 117—33.5 |

J. SPENCER OVERHOLSER, *Primary Examiner.*

RICHARD D. NEVIUS, *Examiner.*